(12) United States Patent
Boyd et al.

(10) Patent No.: US 8,421,620 B2
(45) Date of Patent: *Apr. 16, 2013

(54) ELECTRONICALLY TRIGGERED PERSONAL ATHLETIC DEVICE

(75) Inventors: Edward L. Boyd, Portland, OR (US); Charles W. Case, Jr., Lake Oswego, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,974

(22) Filed: Aug. 10, 2012

(65) Prior Publication Data
US 2012/0299725 A1 Nov. 29, 2012

Related U.S. Application Data

(63) Continuation of application No. 13/110,402, filed on May 18, 2011, now Pat. No. 8,248,247, which is a continuation of application No. 12/058,469, filed on Mar. 28, 2008, now Pat. No. 7,969, 314.

(60) Provisional application No. 60/909,212, filed on Mar. 30, 2007.

(51) Int. Cl.
*G08B 1/08* (2006.01)
(52) U.S. Cl.
USPC ............... 340/539.13; 340/573.1; 340/539.1
(58) Field of Classification Search ............... 340/573.1, 340/539.1, 539.13
See application file for complete search history.

(56) References Cited

U.S. PATENT DOCUMENTS

| | | | |
|---|---|---|---|
| 4,823,367 A | 4/1989 | Kreutzfeld |
| 5,194,861 A | 3/1993 | St. Clair |
| 5,297,110 A | 3/1994 | Ohira et al. |
| 5,511,045 A | 4/1996 | Sasaki et al. |
| 5,516,334 A | 5/1996 | Easton |
| 6,013,007 A | 1/2000 | Root et al. |
| 6,246,362 B1 | 6/2001 | Tsubata et al. |
| 6,761,637 B2 | 7/2004 | Weston et al. |
| 7,063,643 B2 | 6/2006 | Arai |
| 7,969,314 B2 | 6/2011 | Boyd et al. |

(Continued)

FOREIGN PATENT DOCUMENTS

| | | |
|---|---|---|
| CN | 1752831 A | 3/2006 |
| CN | 1823364 A | 8/2006 |

(Continued)

OTHER PUBLICATIONS

Office Action for Japanese Patent Application No. 2010-501263 mailed Jun. 18, 2012.

(Continued)

*Primary Examiner* — Jennifer Mehmood
*Assistant Examiner* — Andrew Bee
(74) *Attorney, Agent, or Firm* — Banner & Witcoff, Ltd.

(57) ABSTRACT

An athletic device is worn by a participant during an athletic event (e.g., a race). In one example, a race course is provided with a plurality of mats or signal devices along the race course. The mats may have antennas and generate a magnetic field. The athletic device may include a chip system having an RFID tag and a display. As the participant progress along the course, the tag is triggered at each mat and race data may be displayed on the device. Data relating to a location of the participant may also be provided to the participant during the athletic event.

18 Claims, 4 Drawing Sheets

U.S. PATENT DOCUMENTS

| | | |
|---|---|---|
| 2005/0212202 A1 | 9/2005 | Meyer |
| 2007/0159926 A1 | 7/2007 | Prstojevich et al. |
| 2007/0247306 A1 | 10/2007 | Case, Jr. |

FOREIGN PATENT DOCUMENTS

| | | |
|---|---|---|
| CN | 1842836 A | 10/2006 |
| JP | 03-243887 | 10/1991 |
| JP | 05-172959 | 7/1993 |
| WO | 9910769 | 3/1999 |
| WO | 01/54072 A1 | 7/2001 |

OTHER PUBLICATIONS

Office Action for Chinese Patent Application No. 200880009867.6 mailed Feb. 13, 2012.

Notice of Reasons for Rejection for Japanese Patent Application No. 2010-501263 mailed Oct. 17, 2011.

European Office Action for Application No. 08744653.0 mailed Apr. 12, 2011.

International Search Report and Written Opinion issued in connection with corresponding PCT Application No. PCT/US2008/058723 mailed Sep. 2, 2008.

International Preliminary Report on Patentability issued in connection with corresponding PCT Application No. PCT/US2008/058723 mailed Oct. 15, 2009.

The second office action for Chinese application No. 200880009867.6 mailed Oct. 9, 2012.

Extended European Search Report for related application No. 12167397.4 mailed Dec. 6, 2012.

ELECTRONICALLY TRIGGERED PERSONAL ATHLETIC DEVICE

CROSS-REFERENCE TO RELATED APPLICATIONS

This application is a continuation of U.S. patent application Ser. No. 13/110,402, entitled "Electronically Triggered Personal Athletic Device" and filed on May 18, 2011, which is a continuation of U.S. Pat. No. 7,969,314, entitled "RFID Triggered Personal Athletic Device" and issued on Jun. 28, 2011, which claims the benefit of U.S. Provisional Patent Application No. 60/909,212, filed on Mar. 30, 2007. The above noted applications are hereby incorporated by reference and made a part hereof.

TECHNICAL FIELD

The present invention generally relates to a personal device used in athletic activity and, more particularly, to a device worn by an athlete such as a runner wherein the device has functionality triggered by RFID sources.

BACKGROUND

Running is a popular form of physical fitness. In conjunction with general running activity, runners often participate in race events such as marathons, 5 ks, 10 ks or other races of varying distances. To judge fitness levels and progress, runners often will record the time it takes to finish a race. Runners may often utilize a stop watch incorporated into a traditional wrist watch that records elapsed time. The watch may have the capability to store split times as a runner progresses along a race course by manually pressing a lap/split button on the watch. Technological advances have provided more sophisticated time keeping, particularly for race events wherein hundreds and even thousands of runners participate in the event. For example, one system provides an automatic timing system utilizing radio frequency identification (RFID) technology. In the system, mats having antennas incorporated therein are placed at the start, finish and other timing locations along a race course. A runner wears a miniature transponder that interacts with the mats as the runner progresses along the race course. As the runner runs the event, time is automatically kept via interaction between the transponder and the mats. Time data is transmitted to a central location wherein race officials can monitor the progress of the race and the times of every participant.

These types of race event systems are typically administered by the race organizer. Accordingly, the time data is also controlled by the race organizer Using the official race event transponders associated with the system, a runner has limited control over the timing data and does not have easy access to make further use of the timing data. In addition, the device usually must be returned to the race organizer. In certain instances where a transponder can be purchased separately, the transponder generally does not have further utility accept for other races utilizing the same type of timing system. Accordingly, while certain race event devices provide a number of advantageous features, they nevertheless have certain limitations. The present invention seeks to overcome certain of these limitations and other drawbacks of the prior art, and to provide new features not heretofore available.

BRIEF SUMMARY

The present invention discloses a personal athletic device having functionality triggered by RFID sources. In one exemplary embodiment, the personal athletic device is used with an automatic timing system that utilizes RFID technology.

According to one aspect of the invention, the personal athletic device is worn by a runner during a race. A race course is provided with a plurality of mats along the race course. The mats have antennas and generate a magnetic field. The personal athletic device has a chip system having an RFID tag and a display. As the runner progresses along the course, the RFID tag is triggered at each mat and split times are displayed on the device 10 as well as total elapsed time.

According to another aspect of the invention, target split times can be uploaded into the personal athletic device. As the runner progresses along the race course, actual split times are displayed adjacent the target split times for comparison by the runner. Additional functionality can be provided in the device to provide additional pace information to the runner.

According to another aspect of the invention, the device is equipped with a display that is a bi-stable display. The bi-stable display is designed to perpetually display the finish time of a runner in the race. The device is used as a souvenir or keepsake from the race.

These and other objects and advantages will be made apparent from the following description of the drawings and detailed description of the invention.

DETAILED DESCRIPTION

Figure 1:
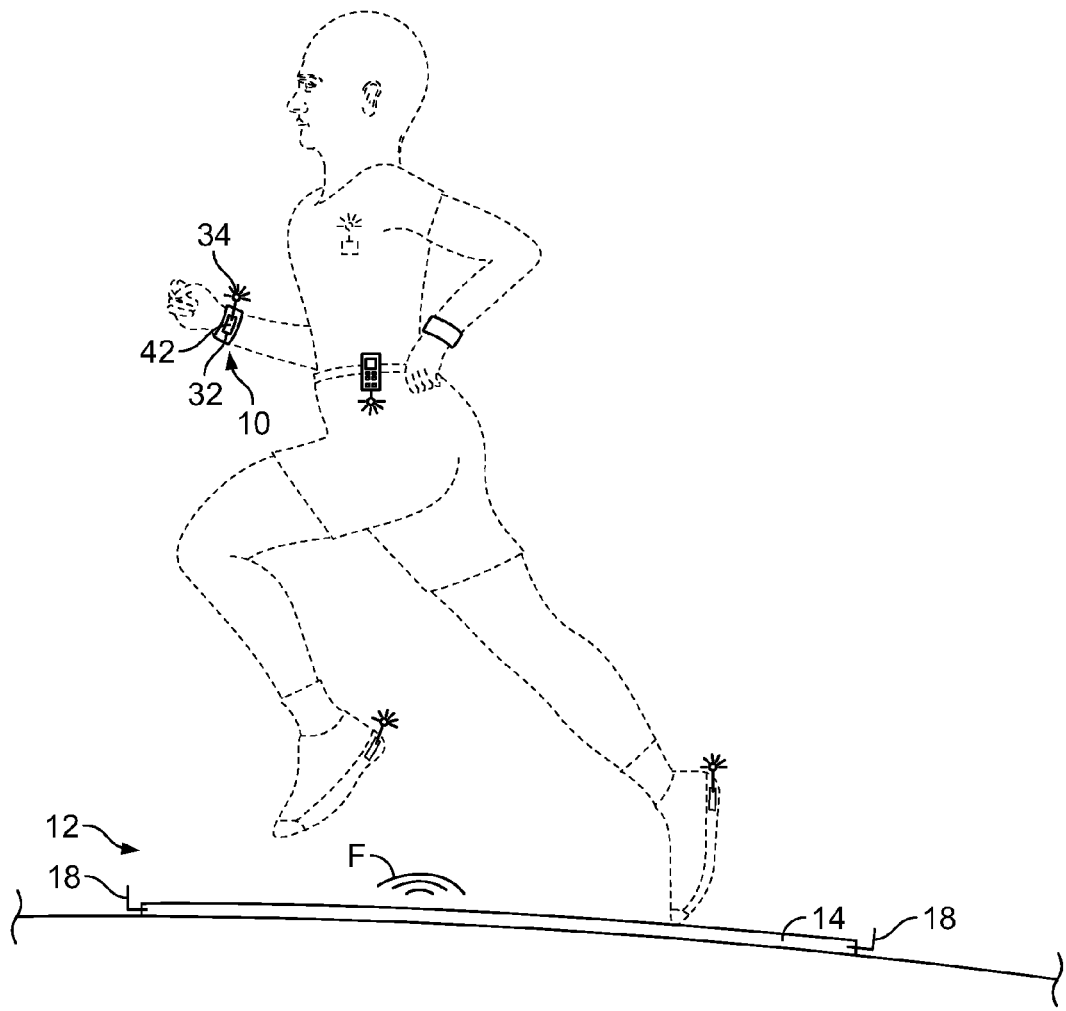
FIG. 1 is illustrates an athlete wearing a personal athletic device of the present invention in an example environment.

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

A personal athletic device is shown in FIG. 1 and generally designated with the reference numeral 10. In one exemplary embodiment described in greater detail below, the personal athletic device 10 is in the form of a bracelet 10 worn by an athlete during a running event such as a marathon or other timed event. The personal athletic device 10 is utilized with a timing system 12 often incorporated into a timed event. The timing system 12 will generally be described followed by a more detailed description of the personal athletic device 10 and its enhanced functional capabilities.

Figure 3:
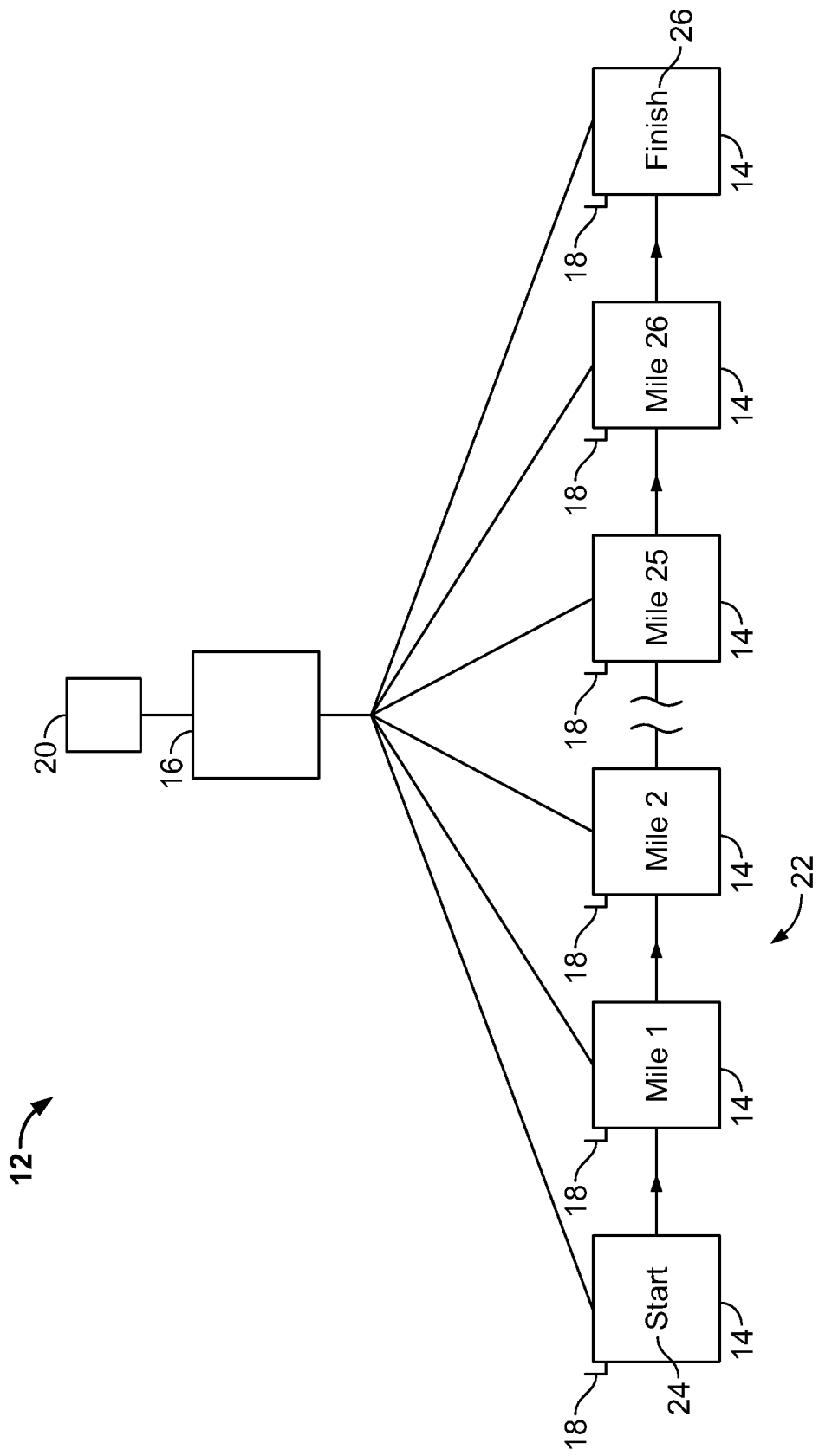
FIG. 3 is a schematic view of a race course and timing system used with the present invention.
Figure 4:
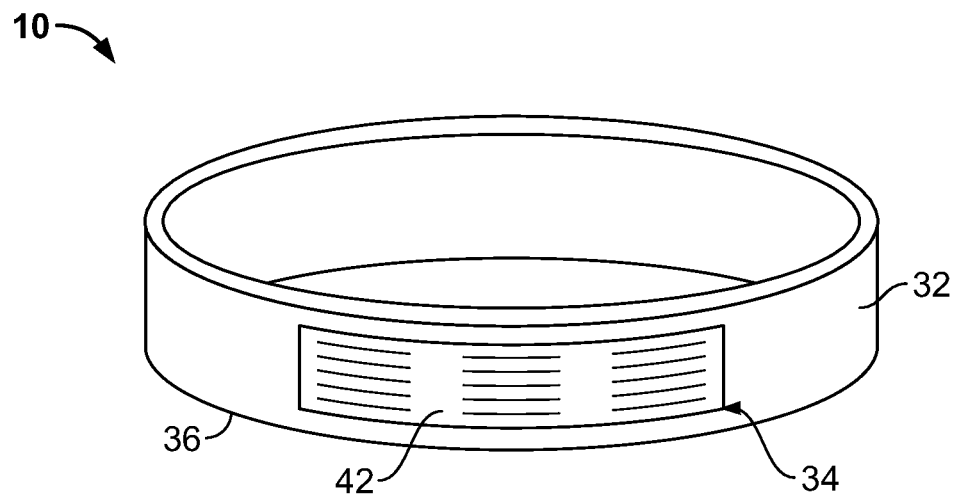
FIG. 4 is front perspective view of the personal athletic device shown in FIG. 1.

The timing system generally includes a plurality of mats 14 and a controller 16. FIG. 1 shows a side view of a mat 14 and FIG. 3 shows a schematic plan view of a plurality of mats 14. The mat 14 generally is a flat member having an antenna 18 embedded in the mat 14 (shown schematically). In certain exemplary embodiments, a plurality of antennas 18 may be embedded into the mat 14. The mat 14 is dimensioned so as to readily accommodate the number of runners expected to participate in an event. The controller 16 is operably connected to the mat(s) 14 and has a reader 20 as well as associated operability components as are known such as a power supply, displays and other signals. It is understood that the controller 16 may comprise a plurality of controllers 16 wherein a controller 16 is associated with each mat 14 and wherein the controller 16 includes a central location for gathering and administering timing data.

As further schematically shown in FIG. 3, a plurality of mats 14 are placed along a race course 22. For example, a mat 14 is placed at the race start 24 as well as the finish line 26. In addition, a plurality of mats 14 are placed at intermediate locations along the race course 22. For a marathon event, for example, mats 14 may be positioned at each mile marker of the race. As will be described in greater detail below, the personal athletic device 10 will interact with the timing system 12 during the event. It is understood that an athlete may utilize other devices such as a chip in the form of a transponder typically worn on the shoe of the athlete. These types of chips, however, have only limited interaction capabilities.

As shown in FIGS. 1, 2, 4 and 5, the personal athletic device 10 generally includes an attachment member 32, and a chip system 34 attached thereto. The chip system 34 is generally in the form of a mini data and signal receiver/transmission device 34.

In one exemplary form of the invention, the attachment member 32 takes the form of a band 36 that is adapted to be worn around the wrist of the runner. The band 36 can be made from a resilient, elastic type material in the form of a solid ring wherein the band 38 can easily stretch over a hand and fit upon the wrist in a generally snug fashion. In alternative forms, the attachment member 32 can include different types of attachment structures such as buckles, snaps, hook and loop fasteners or other types of fasteners if desired. The attachment member 32 could include a break in the structure allowing the member 32 to fit over the wrist via the break. The attachment member 32 can also include other desirable indicia thereon as well as a variety of different colors. The attachment member 32 is further structured and dimensioned to house and support the chip system 34.

Figure 2:
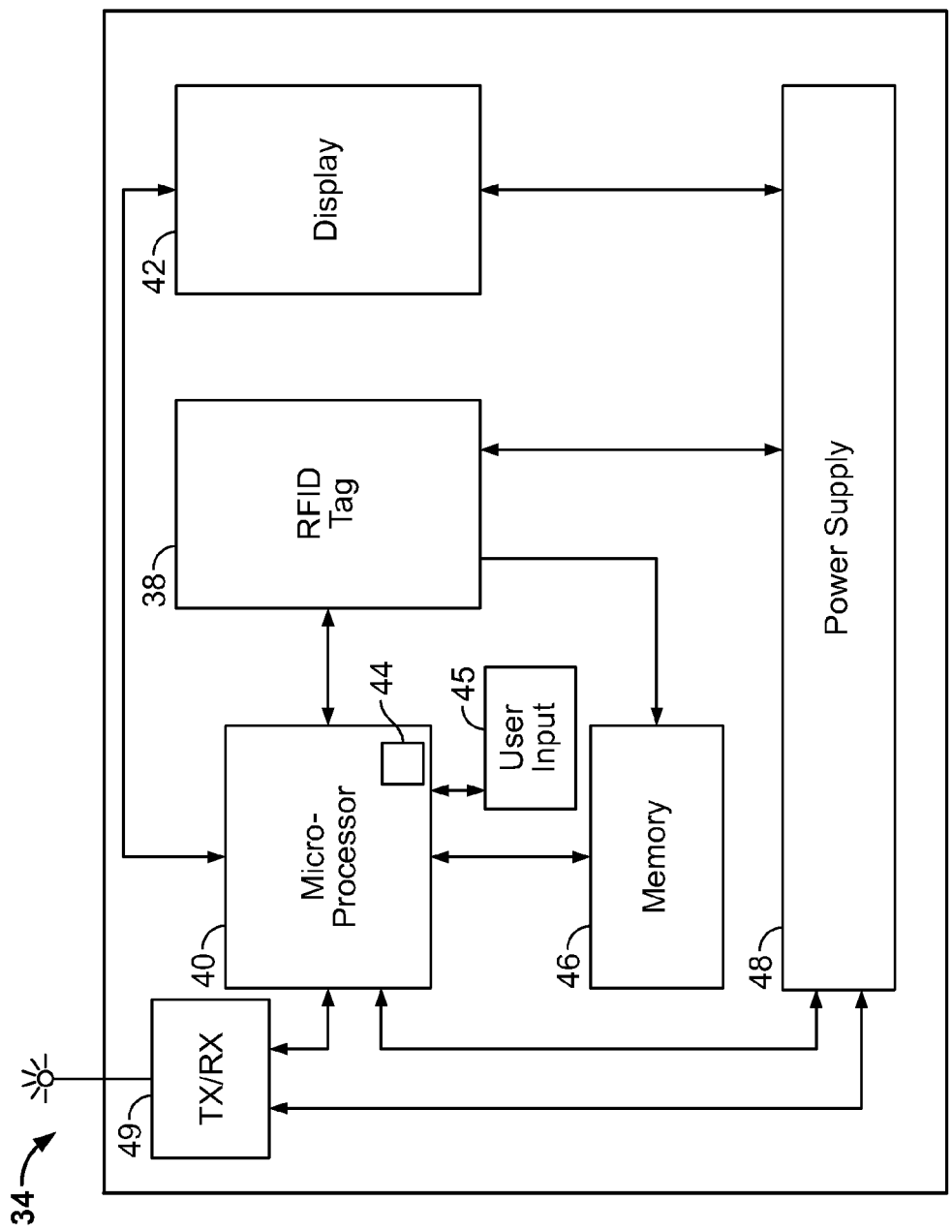
FIG. 2 is a schematic block diagram of a chip system used with the personal athletic device of the present invention.

As further shown in FIG. 2, the chip system 34 is capable of receiving and transmitting signals and data and generally includes a transponder 38, a microprocessor 40, and a display 42. It is understood that the chip system components are operably connected to provide the functions and interactions described herein.

In one exemplary form of the invention, the transponder 38 is an active or passive RFID chip or tag 38. The RFID tag 38 is capable of receiving an initial signal such as magnetic signal from the mat 14 and transmitting a reply in response to the initial signal. The microprocessor 40 can take many different forms and is generally a unit that processes or controls steps, actions and commands associated with the interaction between the device 10 and the timing system 12. The microprocessor 40 specifically includes a simple chronograph 44 for accurate recording of time. Specific functionality associated with the microprocessor 40 will be described in greater detail below when discussing the operation of the device 10 in use with the timing system 12.

The microprocessor 40 also includes memory 46. The memory 46 can be a small amount of flash memory such as EEPROM, and around 1 k in size, although the size of the memory can vary. The microprocessor 40 further includes a power supply 48 such as a battery 48. The battery 48 can take various forms and in an exemplary embodiment, the battery 48 could be a paper battery or similar to a battery used in hearing aid applications. Finally, the display 42 may be a simple display such as a flexible, plastic LED or LCD. The display 42 can be flexible to adhere to the contour of a wrist.

The display 42 is mounted in a location wherein a runner can easily view the display 42. In addition, the chip system 34 may include a user input module 45 wherein the athlete can input information as desired. As described in greater detail below, the chip system 34 may also have a communication element 49 for wireless communication. It is understood that the various components of the chip system 34 may be contained within a small housing that is supported by the attachment member 32. It is further understood that the chip system 34 can be capable of wireless transmission and overall wireless communication with other types of devices, as well as be equipped with data transmission ports if desired.

Operation of the personal athletic device 10 will now be described using a marathon event as an example. As described above, the mats 14 are positioned along the designated race course 22 (FIG. 3). A mat 14 is placed at the start 24 of the course 22 as well as at the end of the course defining the finish line 26. In addition, a plurality of other mats 14 are positioned at intermediate locations along the race course 22 such as at each mile marker, e.g. from mile marker no. 1 through mile marker no. 26. It is understood that the mats 14, equipped with the appropriate antennas etc., will generate a magnetic field F (FIG. 1) from the mat 14.

A runner participating in the marathon event wears the device 10 on the wrist wherein the device 10 may simply be considered a bracelet. As the runner starts the race, the mat 14 at the starting line 24, via the generated magnetic field F, triggers the RFID tag 38 which in turn starts the chronograph 44 of the microprocessor 40. The elapsed race time is also displayed on the display 42. Each subsequent mat 14 along the race course similarly triggers the RFID tag 38 and displays a mile split time on the display 42. The chip system 34 is designed to display the split time for several seconds on the display 42 and then change the display 42 to continue displaying the elapsed race time. The device 10 may also have a vibration signal, audible signal or other type of signal to indicate to the runner to view the display 42 to see the split time. It is further understood that when the RFID tag 38 is triggered at the mile markers, the split times are also saved in the memory 46. At the finish 26, the mat 14 at the finish line triggers the RFID tag 38 to record and display the final race time and stop the chronograph 44. In typical configurations, a runner uses a watch and presses a lap/split button on the watch upon reaching each mile marker along the race course. The personal athletic device 10 may be considered a simple runners chronograph wherein the lap/split button is replaced by the RFID prompt at the mile markers and the interaction between the device 10 and the timing system 12. Split times and finish time can then be automatically recorded personally by each runner eliminating the need for manual steps taken by the runner. In addition, this information is immediately displayed to the runner rather than only being saved by the controller 16 of the timing system 12 administered by the race organizer. Until now, such data was not immediately available to the runner by being shown on the display 42.

The personal athletic device 10 may also have enhanced timing capabilities. For example, a runner may design a race plan having desired target split times. Prior to the race, the runner uploads the target split times and stores the times in the memory 46 of the device 10. The uploading can take place from various locations such as a personal computer, a kiosk that may be affiliated with the race organizer or other interested entity, and further be done either through a data port connection or wireless transmission. With respect to a particular marathon course, the kiosk could calculate corrected mile split times if necessary and place the times on the device 10 in the memory 46. During the race, at each mile marker, the display 42 shows the actual split time as described above as well as the target split time pre-entered into the device 10 for comparison by the runner. The microprocessor 40 may have additional communication capabilities to indicate to the runner whether the runner is on pace, ahead of pace, or behind pace as preset by the runner.

Figure 5:
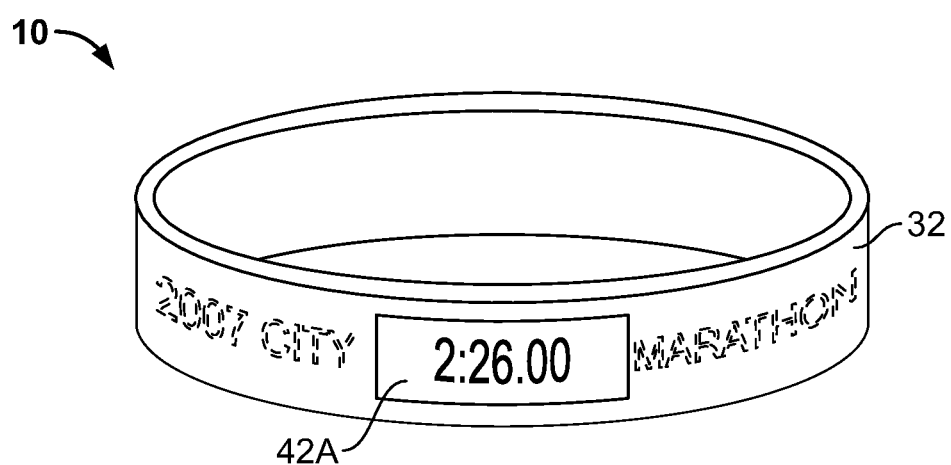
FIG. 5 is a front perspective view of an alternative embodiment of a personal athletic device of the present invention.

In another exemplary embodiment, the personal athletic device 10 can take more a more simplified form in functionality and merely display a finish time of a race event. Accordingly, the personal athletic device 10 is activated when the runner passes the starting line and the chronograph 44 keeps time as the runner progresses along the course 22. Upon crossing the finish line 26, the final time is displayed on the display 34 such as shown in FIG. 5. In this embodiment, the display 42 is preferably a bi-stable display 42A wherein the finish time is perpetually displayed on the display 42. As the display 42 is a bi-stable display, no power is required for the display 42 to continually display the finish time. As such, the personal athletic device 10 can be used as a souvenir or keepsake from the race event to be placed on a shelf or mantle.

As discussed, the personal athletic device 10 can have wireless transmission capabilities. The device 10 could transmit the timing information for the runner to another computer which could transmit the information to another location such as a website having additional functional capabilities. For example, the website could display additional race times for comparison or race times for runners in a particular group. The website could be a website affiliated with the race organizer or a separate website associated with the runner. It is also understood that in another exemplary embodiment of the invention, the device 10 could not include the display 42. In this configuration, the race data including split times can be downloaded to another computer such as at a kiosk for additional transmission such as to a website.

It is understood that the personal athletic device 10 is programmed with a unique RFID serial number. This unique number can be associated with the name and personal information of an individual. Accordingly, with appropriate cooperation with race organizers, the personal athletic device 10 could be used to enter race events such as at a kiosk or other central location. As all of the pertinent information is contained in the device 10, registration can be streamlined and more efficient. Payment capabilities such as using credit card or other information could also be incorporated into the device 10 to further enhance registration capabilities.

It is understood that wearing the personal athletic device 10 on the wrist is one exemplary form of the invention. The device 10 can also be worn on other locations such as the arm, on apparel, on glasses having a display, as well as on shoes if desired. The device 10 could also be equipped with an audio component wherein an athlete can hear time information via earphones.

It is also understood that the personal athletic device 10 and its functionality could be incorporated into a full featured watch having traditional watch functions, a phone, a digital music player, a heart rate monitor, electronic devices worn on or in soles of shoes, or other electronic devices. The device 10 could also be equipped with enhanced communication capabilities to communicate with such other electronic devices as schematically indicated in FIG. 1. With respect to a digital music player configuration, the functionality of the present invention can specifically be incorporated into an IPOD® brand digital music player available from Apple, Inc. of Cupertino, Calif. In such a configuration, there can be ongoing audio communication to the runner including specific timing related communications based on the various checkpoints or mile markers reached during a race event. Communications to the device 10 could also take various forms including custom coaching or motivational messages. The RFID triggers could also incorporate global positioning functions including pre-entering location information about a race course. A GPS signal could then trigger the device 10 to provide useful information to the runner.

While a specific example has been described herein relating to a marathon event, it is understood that the personal athletic device 10 could be used in other timed events. For example, bikers and swimmers could also use the device as well as athletes participating in triathlons.

The personal athletic device 10 of the present invention possesses enhanced functionality over prior art systems. The device 10 can be designed to be reused at multiple race events. The memory can be cleared and the chronograph can be reset for another race. The memory could also be sized to maintain race data for multiple events. Alternatively, the device 10 can be designed for a one-time use, such as the embodiment described above having the bi-stable display. Furthermore, the components of the device 10 can be selected having the functionality described above but wherein the device 10 is considered to be for a one-time use and disposable. Using the device 10 of the present invention is more desirable than the traditional shoe-mounted transponder as the device 10 provides a display as well as instant access to the timing data generated with the timing system 12 for further use and review by the runner.

Finally, the personal athletic device 10 can be utilized in displaying messages at locations unrelated to timing events. For example, a retail establishment could include mats 14 or other appropriate signal generating device at its location. An individual wearing the device 10 and entering the location could be randomly selected to win a reward such as merchandise or other reward. A message could be displayed on the display 42 indicating "winner." The device 10 could also be used for gaming such as scavenger hunts to log that a person was near a designated marker.

While the specific embodiments have been illustrated and described, numerous modifications come to mind without significantly departing from the spirit of the invention and the scope of protection is only limited by the scope of the accompanying Claims.

What is claimed is:

1. A device comprising:
a receiver configured to receive signals during an athletic event, wherein the signals cause the device to automatically determine one or more measured times for a participant during the athletic event;
at least one processor; and
memory operatively coupled to the at least one processor and storing computer readable instructions that, when executed, cause the device to:
detect multiple distinct electronic signals generated along a course associated with the athletic event during the athletic event, wherein the electronic signals are specific to the athletic event;
record the one or more measured times based on the detected multiple distinct electronic signals generated along the course;
in response to detecting at least one of the multiple distinct electronic signals:
determine a current geographic location of the athlete;
retrieve, based on the determined current geographic location of the athlete, predefined location information describing the geographic location, wherein the location information is defined prior to determining the current geographic location of the athlete; and convey the predefined location information to the athlete.

2. The device of claim 1, wherein the receiver comprises a radio frequency identification (RFID) transceiver and wherein the detected electronic signals include radio frequency signals.

3. The device of claim 1, wherein the computer readable instructions, when executed, cause the device to display a first measured split time for the athlete during the athletic event simultaneously with a first user-defined split time in response to detecting each of the multiple distinct electronic signals.

4. The device of claim 3, wherein the computer readable instructions, when executed, further cause the device to further display a comparison between the first measured split time and the first user-defined split time, wherein the comparison includes a visual indication of whether the athlete is ahead of, behind or on-track relative to the first user-defined split time, wherein the visual indication is different from the first measured split time and the first user-defined split time.

5. The device of claim 3, wherein the computer readable instructions, when executed, further cause the device to display an elapsed time for the athlete during the athletic event.

6. The device of claim 1, further comprising a bistable display, the bistable display being configured to perpetually display the elapsed time for the athlete at the conclusion of the athletic event.

7. The device of claim 1, wherein the device is further caused to transmit, through the transceiver during an athlete registration process for the athletic event, personal information specific to the athlete including payment information, the athlete registration process occurring prior to a start of the athletic event.

8. The device of claim 1, wherein the electronic signals are received from devices located along the course.

9. A method comprising:
    detecting, by a wearable device during the athletic event, multiple distinct electronic signals generated along a course associated with an athletic event;
    record, by the wearable device, one or more measured times based on the detected multiple distinct electronic signals generated along the course, wherein the electronic signals are specific to the athletic event;
    in response to detecting at least one of the multiple distinct electronic signals:
        determine, by the wearable device, a current geographic location of the athlete;
        retrieve, by the wearable device and based on the determined current geographic location of the athlete, predefined location information describing the geographic location, wherein the location information is defined prior to determining the current geographic location of the athlete; and
        convey the predefined location information to the athlete.

10. The method of claim 9, further comprising displaying a pace of the athlete during the athletic event.

11. The method of claim 9, further comprising perpetually displaying, by a display coupled to a transceiver of the wearable device, an indication of the athlete's performance at the conclusion of the timed event.

12. The method of claim 11, further comprising perpetually displaying, by the display coupled to the transceiver, an elapsed time for the timed event at the conclusion of the timed event.

13. The method of claim 9, further comprising transmitting, by the wearable device, an indication of the athlete's performance to a remote system during the timed event.

14. The method of claim 9, further comprising:
    receiving, by the wearable device during the timed event, a motivational message for the athlete from a remote device upon detecting a signal generated along the course.

15. A non-transitory computer readable medium storing computer readable instructions that, when executed, cause an apparatus to:
    detect multiple distinct electronic signals generated along a course associated with an athletic event;
    record one or more measured times based on the detected multiple distinct electronic signals generated along the course, wherein the electronic signals are specific to the athletic event;
    in response to detecting at least one of the multiple distinct electronic signals:
        determine a current geographic location of the athlete;
        retrieve, based on the determined current geographic location of the athlete, predefined location information describing the geographic location, wherein the location information is defined prior to determining the current geographic location of the athlete; and
        convey the predefined location information to the athlete.

16. The non-transitory computer readable medium of claim 15, wherein the computer readable instructions, when executed, further cause the apparatus to perpetually display an indication of the athlete's performance at the conclusion of the timed event.

17. The non-transitory computer readable medium of claim 16, wherein the computer readable instructions, when executed, further cause the apparatus to perpetually display an elapsed time for the timed event at the conclusion of the timed event.

18. The non-transitory computer readable medium of claim 15, wherein the computer readable instructions, when executed, further cause the apparatus to transmit an indication of the athlete's performance to a remote system during the timed event.

* * * * *